(12) United States Patent
Holden et al.

(10) Patent No.: US 7,967,360 B2
(45) Date of Patent: Jun. 28, 2011

(54) REMOVABLE VISOR

(75) Inventors: Pete Holden, Grand Rapids, MI (US); Shane Vorac, Kalamazoo, MI (US); Tom Brookhouse, Zeeland, MI (US); Vince Boraas, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 12/528,664

(22) PCT Filed: Mar. 18, 2008

(86) PCT No.: PCT/US2008/057356
§ 371 (c)(1),
(2), (4) Date: Feb. 23, 2010

(87) PCT Pub. No.: WO2008/115921
PCT Pub. Date: Sep. 25, 2008

(65) Prior Publication Data
US 2010/0187851 A1    Jul. 29, 2010

Related U.S. Application Data

(60) Provisional application No. 60/907,063, filed on Mar. 19, 2007.

(51) Int. Cl.
*B60J 1/02* (2006.01)
(52) U.S. Cl. .................................................. 296/97.13
(58) Field of Classification Search ............... 296/97.12, 296/97.13; 248/289.1, 222.3, 221.3, 222.1, 248/27.1, 289.11, 291.1, 229.16, 229.26, 248/231.81, 231.9, 224.8, 222.51, 222.52; 411/349, 84, 85, 552, 553; 403/348, 349, 252, 353
See application file for complete search history.

(56) References Cited

U.S. PATENT DOCUMENTS

| | | |
|---|---|---|
| 2,357,974 A | 9/1944 | Roberts |
| 3,017,217 A | 1/1962 | Keating |
| 3,767,256 A | 10/1973 | Sarkees |
| 3,853,414 A | 12/1974 | Hirano et al. |
| 3,986,780 A | 10/1976 | Nivet |

(Continued)

FOREIGN PATENT DOCUMENTS

EP    1 502 788 A1    2/2005

(Continued)

OTHER PUBLICATIONS

PCT International Search Report corresponding to PCT/US2008/057356, dated Jul. 17, 2008, 2 pages.

(Continued)

*Primary Examiner* — Lori L Lyjak
(74) *Attorney, Agent, or Firm* — Foley & Lardner LLP

(57) ABSTRACT

A removable visor and method for installing a removable visor is provided. The removable visor includes a cover having a slot, a bracket, positioned inside the cover, having a flexible snap configured to be inserted into the slot, an elbow, attached to the bracket through an opening in the cover, an arm extending from the elbow and a visor attached to the arm. The top of the bracket of the assembled visor, having at least one lobe, is inserted through an opening in the interior ceiling of the vehicle. The bracket is rotated inside the cover so that the flexible snap engages the slot and locks the bracket to the cover, wherein the at least one lobe pinches down on the interior ceiling, connecting the removable visor to the interior ceiling.

20 Claims, 9 Drawing Sheets

U.S. PATENT DOCUMENTS

| | | |
|---|---|---|
| 3,999,871 A | 12/1976 | Palmer et al. |
| 4,029,953 A | 6/1977 | Natoli |
| 4,148,519 A | 4/1979 | Hollar, Jr. |
| 4,178,035 A | 12/1979 | Cziptschirsch |
| 4,377,020 A | 3/1983 | Vigo |
| 4,392,279 A | 7/1983 | Schwager |
| 4,525,008 A | 6/1985 | Foggini |
| 4,529,157 A | 7/1985 | Suman et al. |
| 4,533,275 A | 8/1985 | Foggini |
| 4,553,797 A | 11/1985 | Marcus |
| 4,569,552 A | 2/1986 | Marks |
| 4,634,196 A | 1/1987 | Nestell |
| 4,653,708 A | 3/1987 | Rich |
| 4,756,570 A | 7/1988 | Cooper |
| 4,765,674 A | 8/1988 | Svensson |
| 4,818,013 A | 4/1989 | Van Order |
| 4,858,983 A | 8/1989 | White |
| 4,893,866 A | 1/1990 | Dowd |
| 4,913,484 A | 4/1990 | Dowd |
| 4,998,767 A | 3/1991 | Lawassani et al. |
| 5,013,954 A | 5/1991 | Shibaike et al. |
| 5,018,901 A | 5/1991 | Ferree et al. |
| 5,031,953 A | 7/1991 | Miller |
| 5,056,853 A | 10/1991 | Van Order |
| 5,061,005 A | 10/1991 | Van Order et al. |
| 5,062,608 A | 11/1991 | Phelps et al. |
| 2002/0089210 A1 | 7/2002 | Beaver |

FOREIGN PATENT DOCUMENTS

| | | | |
|---|---|---|---|
| WO | WO 99/19160 A1 | 4/2009 | |

OTHER PUBLICATIONS

PCT Written Opinion corresponding to PCT/US2008/057356, dated Jul. 17, 2008, 6 pages.

REMOVABLE VISOR

CROSS REFERENCE TO RELATED PATENT APPLICATIONS

The present application is a National Stage of PCT/US2008/057356, filed Mar. 18, 2008 which claims priority to and the benefit of U.S. Provisional Patent Application No. 60/907,063, filed on Mar. 19, 2007. The foregoing applications are incorporated by reference herein in their entirety.

BACKGROUND

The following background is provided simply as an aid in understanding the disclosed device and is not admitted to describe or constitute prior art.

The present device is generally related to a sun visor for a vehicle. Specifically, the device is directed to a removable visor for a vehicle.

Conventional visor assemblies are mounted to the interior of the vehicle with screws. In order to remove a visor of this type, a screw driver or other tool must be used to unscrew the visor from the interior of the vehicle. Depending on the vehicle type, this may take several minutes. In addition, the screws used to mount the visor are generally small and can be easily lost. Time and the risk of losing parts make attaching and detaching the visor an undesirable task. Thus, a system that allows for the easier removal and attachment of a visor is desired.

SUMMARY

According to one embodiment, a removable visor includes a cover having a slot; a bracket, configured to be positioned inside the cover, having a flexible snap configured to be inserted into the slot; an elbow, configured to be attached to the bracket through an opening in the cover; an arm extending from the elbow; and a visor attached to the arm.

According to another embodiment, when the flexible snap engages the slot, the removable visor is locked into an interior ceiling of a vehicle.

According to yet another embodiment, when the removable visor is in a locked position, the flexible snap may be depressed in order to rotate the removable visor into a position where the removable visor can be removed from the interior ceiling of the vehicle.

According to still another embodiment, assembling a removable visor, includes the steps of providing a cover having a slot, positioning a bracket inside the cover, wherein the bracket has a flexible snap inserted into the slot and at least one lobe positioned on the top of the bracket, configured to attach the removable visor to an interior ceiling of a vehicle, attaching an elbow to the bracket through an opening in the cover, wherein an arm extends from the elbow and attaching a visor to the arm. Given the assembled visor, the top of the bracket having at least one lobe is inserted through an opening in the interior ceiling of the vehicle. The bracket is rotated inside the cover so that the flexible snap engages the slot and locks the bracket to the cover, wherein the at least one lobe pinches down on the interior ceiling, connecting the removable visor to the interior ceiling.

It is to be understood that both the foregoing general description and the following detailed description are exemplary and explanatory only. These and other features, aspects and advantages will become apparent from the following description and the accompanying exemplary embodiments shown in the drawings, which are briefly described below.

Embodiments of the present device will be described below with reference to the accompanying drawings. It should be understood that the following description is intended to describe exemplary embodiments, and not to limit the disclosed device.

DETAILED DESCRIPTION

Figure 1:
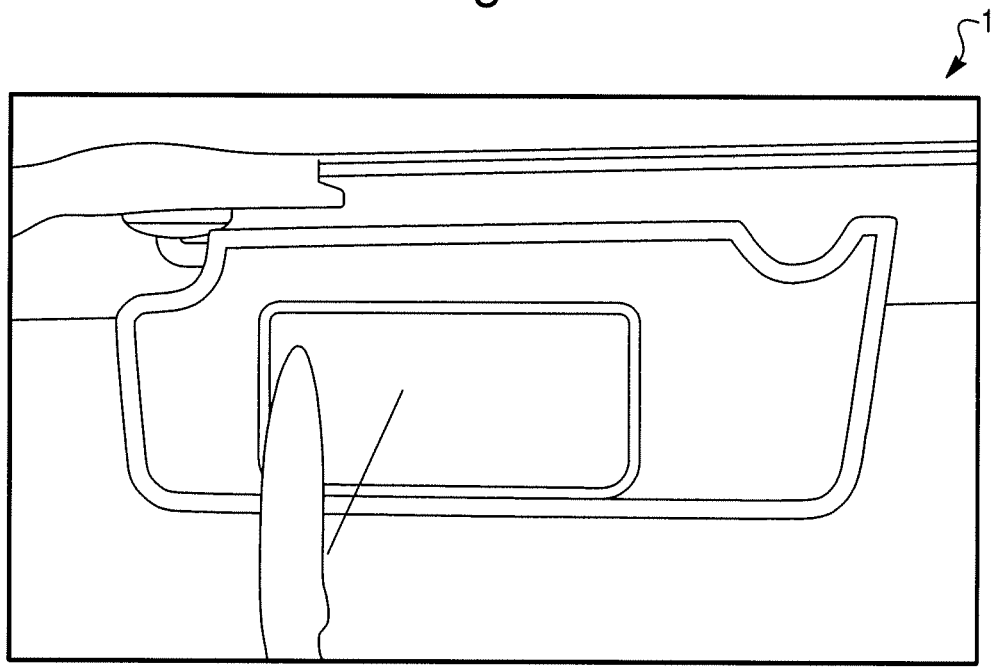
FIGS. 1 and 2 are perspective views of a removable visor mounted inside a vehicle, according to one embodiment.
Figure 2:
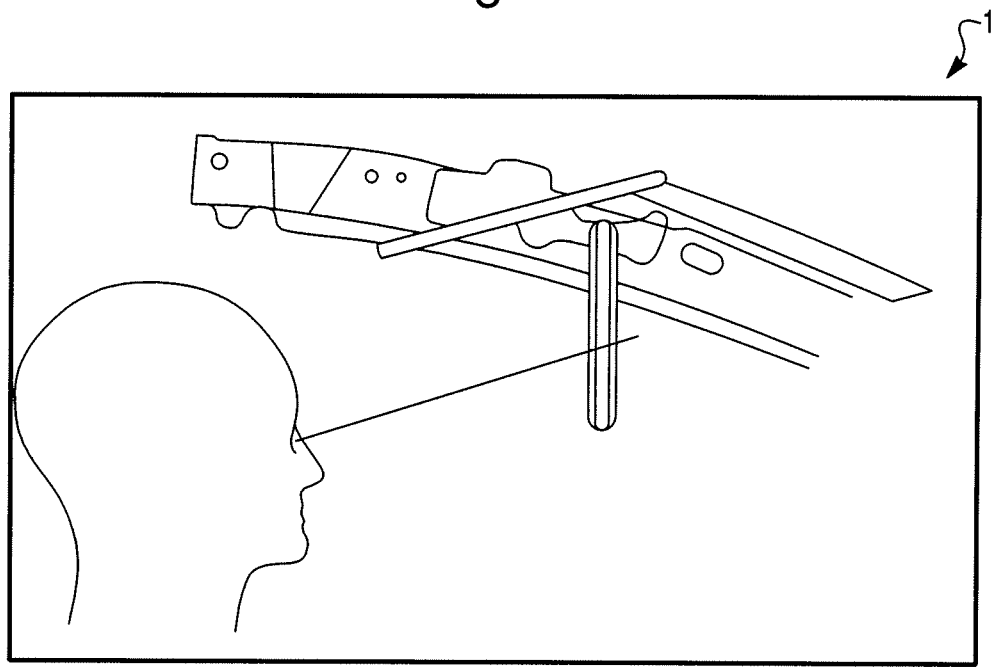

FIGS. 1 and 2 show a removable visor 1 mounted to the interior of a vehicle, according to one embodiment. FIG. 1 is an illustration of the visor 1 from the perspective of a driver. FIG. 2 is a side view of the visor 1. Generally, the removable visor 1 is used by a driver to block the sun which may obstruct the driver's view. The components of the removable visor are described in further detail below.

Figure 3:
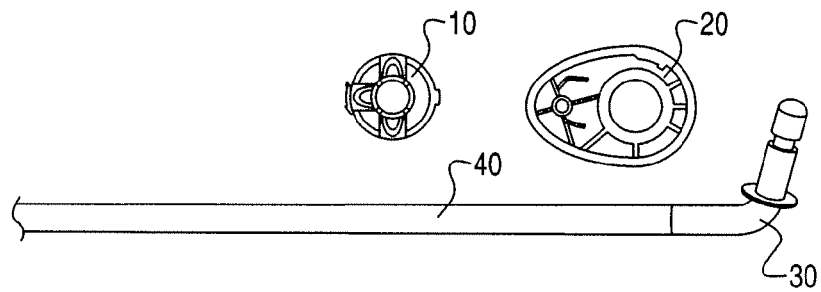
FIG. 3 is a top view of a bracket, cover and elbow for a removable visor, according to one embodiment.

FIG. 3 is a top view of components for a removable visor 1, according to one embodiment. FIG. 3 shows a bracket 10, a cover 20 and an elbow 30. When the removable visor 1 is assembled, the bracket 10 is positioned in the cover 20. As will be described in further detail below, the bracket 10 is configured to rotate inside the cover 20. The elbow 30 fits through the opening in the cover 20 and is attached to the bracket 10 positioned inside the cover 20. The visor 50 (see FIG. 14) is attached to the arm 40 that extends from the elbow 30. According, to one embodiment, the above-described components are comprised of nylon and/or plastic.

Figure 4:
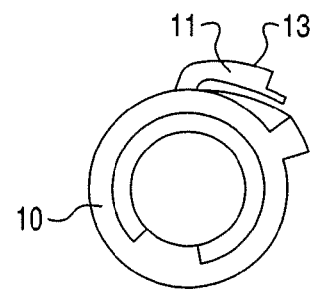
FIG. 4 is a perspective view of a bracket for a removable visor, according to one embodiment.
Figure 5:
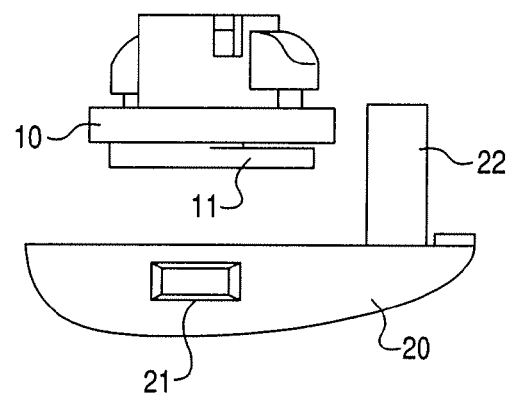
FIG. 5 shows a bracket and cover for a removable visor, according to one embodiment.
Figure 6:
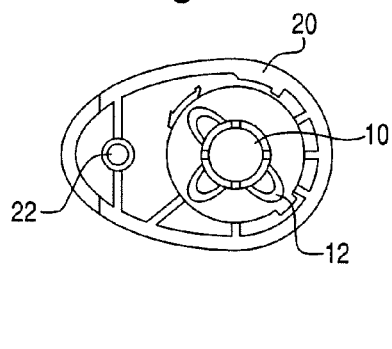
FIG. 6 is a top view of a cover attached to a bracket for a removable visor, according to one embodiment.
Figure 10:
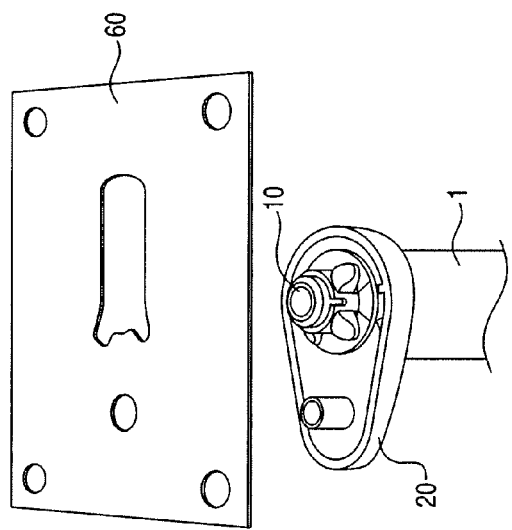
FIGS. 10-12 are perspective views of a removable visor in an installation position being inserted into a sheet of vehicle steel, according to one embodiment.

As shown in FIGS. 4 and 5, the bracket 10 may have a cylinder-like structure. The bracket 10 can have a flexible snap 11 that extends from the perimeter of the bracket 10. A rib 13 can be positioned at one end of the flexible snap 11. As shown in FIG. 6, the bracket 10 also can have at least one lobe 12. The lobe 12 can be configured to attach the removable visor 1 to a portion of a vehicle, such as a vehicle sheet steel 60 (see FIGS. 10-12). Preferably, the bracket 10 includes three lobes 12.

Figure 7:
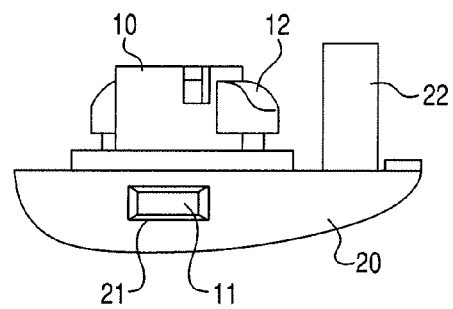
FIG. 7 is a perspective view of a cover attached to a bracket for a removable visor, according to one embodiment.
Figure 17:
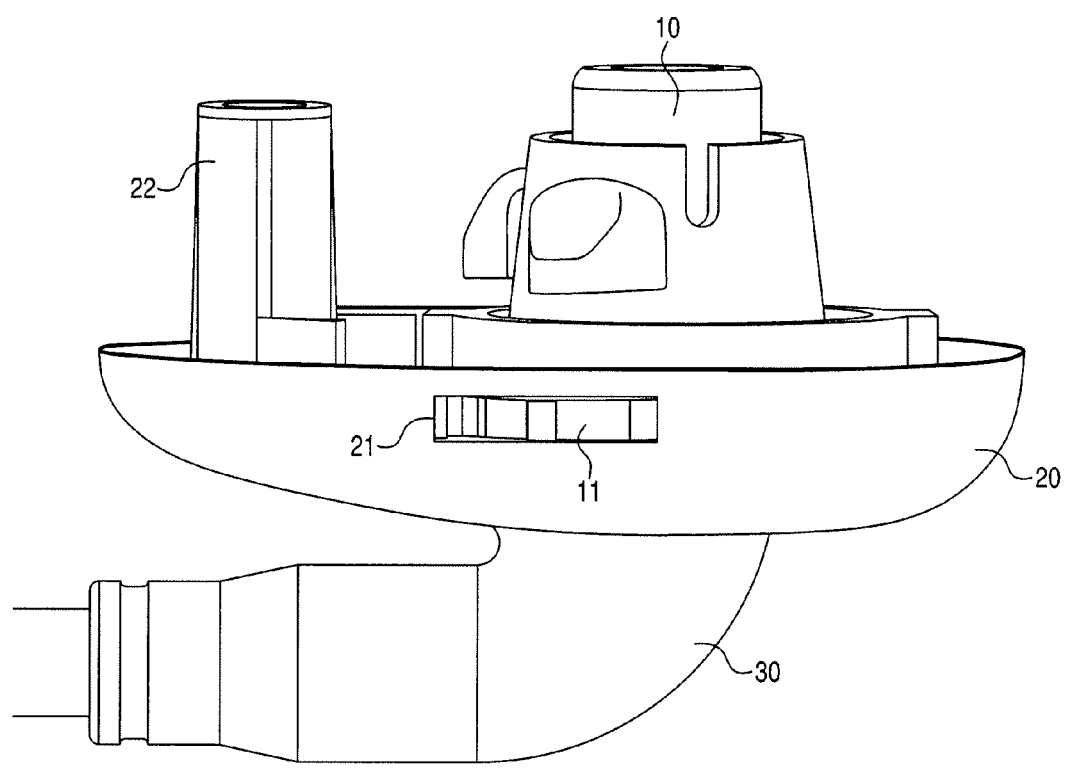
FIG. 17 is a perspective view of a bracket attached to a cover of a removable visor, according to one embodiment.
Figure 18A:
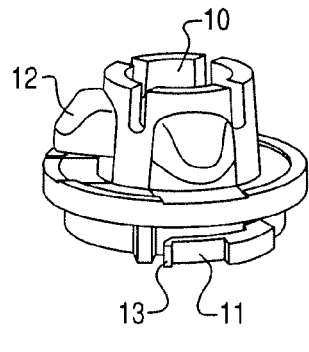
FIG. 18 is a perspective, top and profile view of a bracket, a cover, a cover attached to a bracket and a bracket engaged with a cover according to one embodiment.
Figure 18B:
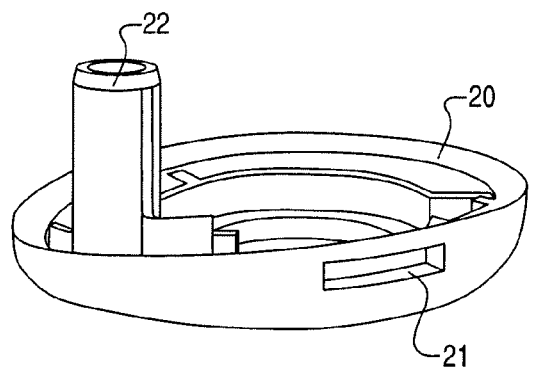
Figure 18C:
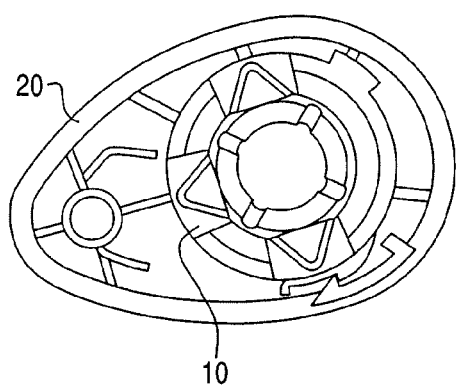
Figure 18D:
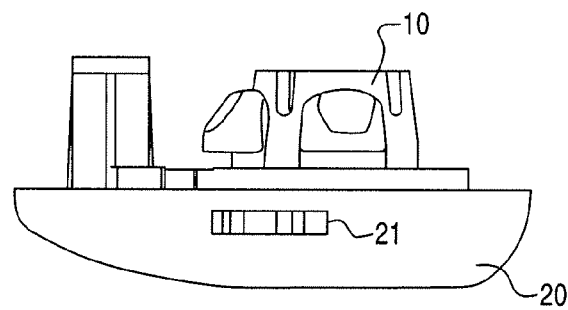
Figure 18E:
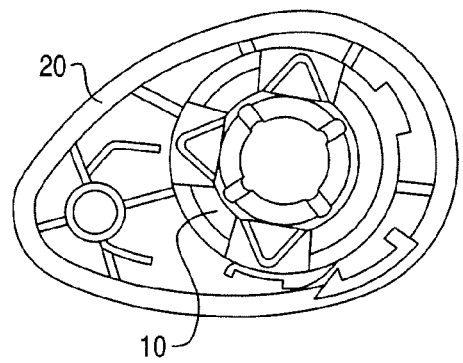
Figure 18F:
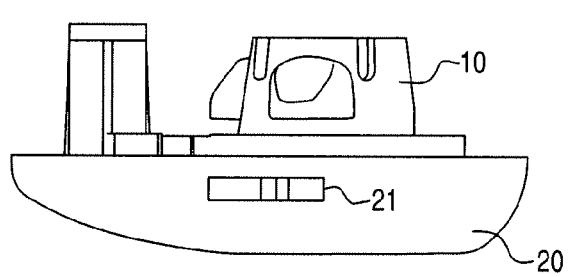

The cover 20 preferably is substantially bowl shaped and configured to receive the bracket 10. In addition, the cover 20 includes a slot 21 and a peg 22. The slot 21 can be shaped like a rectangle. During assembly of the removable visor 1, the flexible snap 11 is inserted into the slot 21. FIG. 7 shows the initial position of the bracket 10 after it has been inserted into the cover 20. The flexible snap 11 is positioned in the far right edge of the slot 21. According to another embodiment, FIG. 17 shows the initial position of the bracket 10 after it has been inserted into the cover 20.

Figure 8:
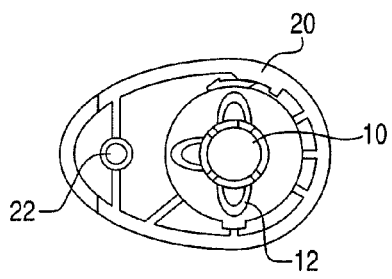
FIG. 8 is a top view of a bracket engaged with a cover for a removable visor, according to one embodiment.
Figure 9:
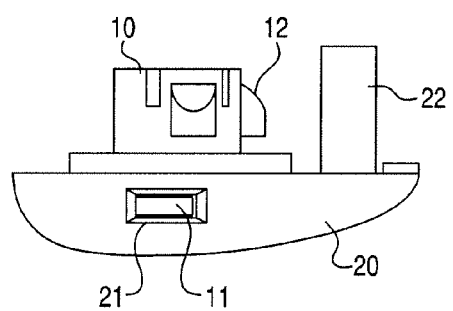
FIG. 9 is a perspective view of a bracket engaged with a cover for a removable visor, according to one embodiment.
Figure 15:
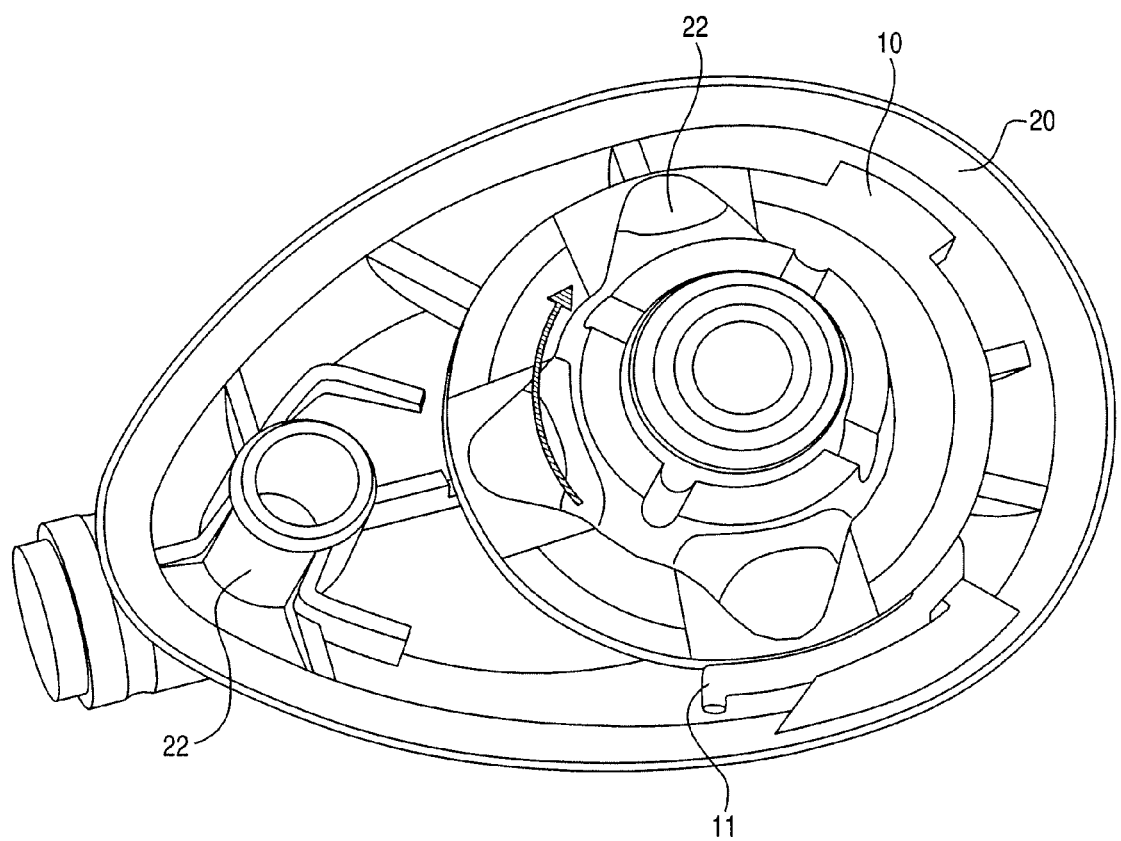
FIG. 15 is a top view of a bracket attached to a cover of a removable visor, according to one embodiment.
Figure 16:
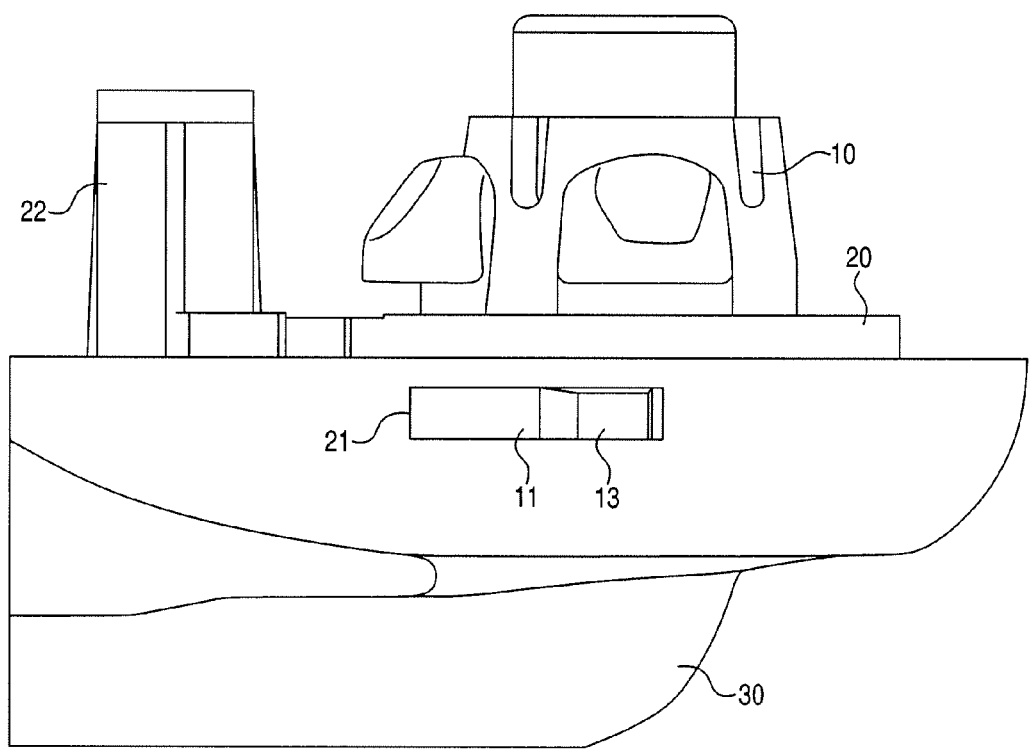
FIG. 16 is a perspective view of a bracket attached to a cover of a removable visor, according to one embodiment.

As shown in FIGS. 8 and 9, the bracket 10 can be rotated inside the cover 20 which inserts the flexible snap 11 into the slot 21 and locks the bracket 10 to the cover 20. During the rotation of the bracket 10, the cover 20 can remain stationary. In one embodiment, the bracket 10 is rotated clockwise 45°. FIGS. 8, 9 and 15 shows the flexible snap 11 inserted into the slot 21, effectively locking the bracket 10 to the cover 20. According to another embodiment, FIG. 16 shows the flexible snap 11 inserted into the slot 21.

Figure 11:
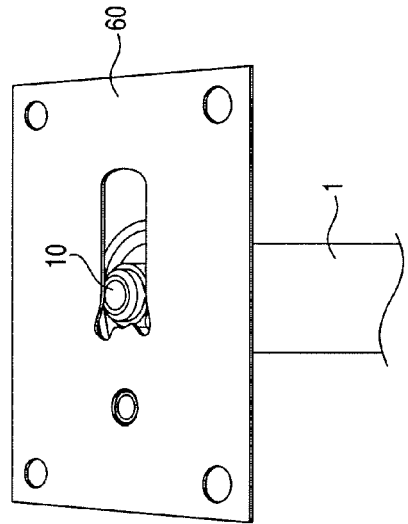
Figure 12:
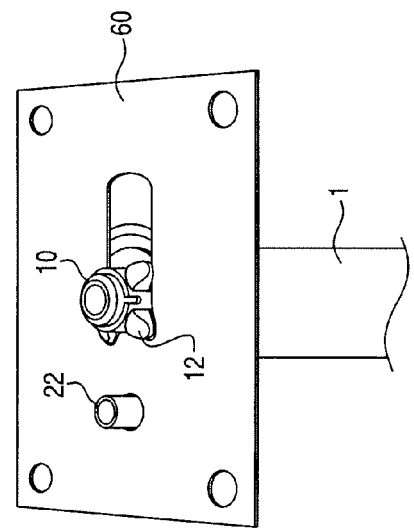
Figure 13:
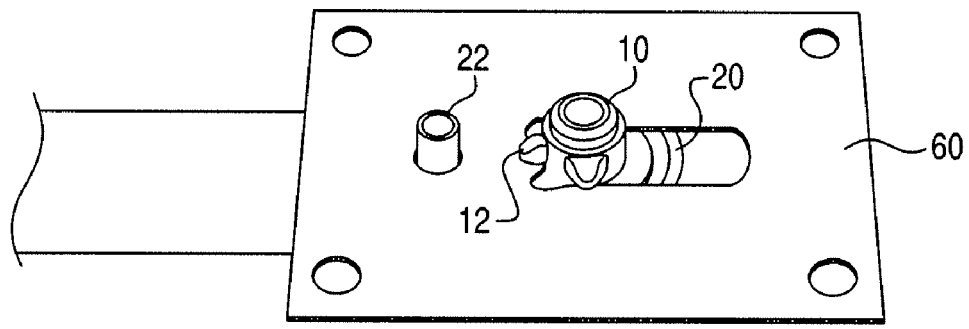
FIG. 13 is a perspective view of an installed removable visor.

FIGS. 10-14 illustrate how the removable visor 1, once assembled, is mounted to the vehicle sheet steel 60 of a vehicle. As shown in FIGS. 11 and 12, the portion of the bracket 10 having one or more lobes 12 is inserted through an opening in the vehicle sheet steel 60. The peg 22 is inserted in a separate opening of the vehicle sheet steel 60. As shown in FIG. 13, the removable visor 1 is rotated clockwise. The sheet steel 60 is pinched between the lobes 12 and the bracket 10. Accordingly, the removable visor 1 is securely mounted to the vehicle sheet steel 60.

Figure 14:
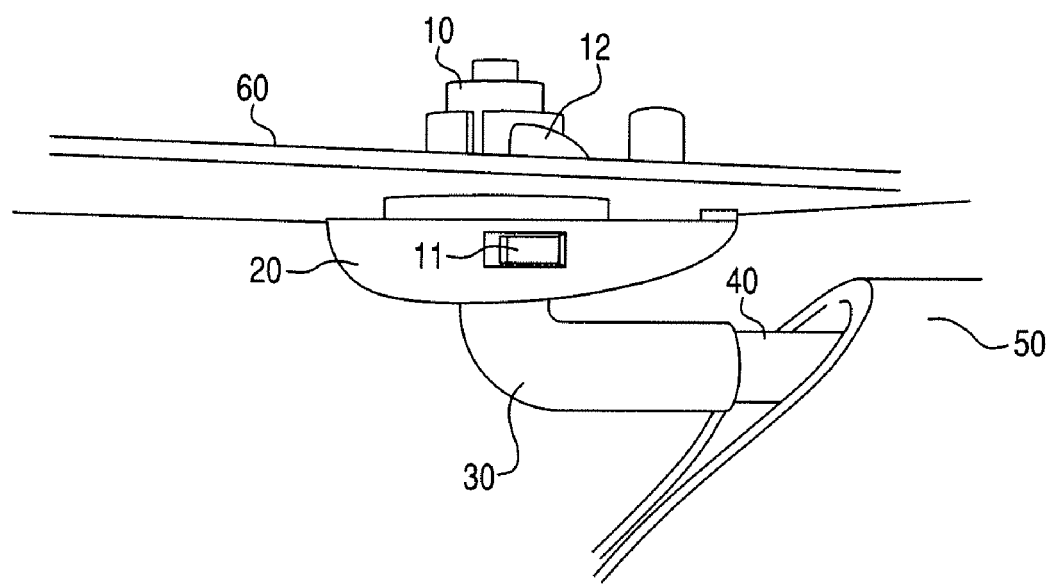
FIG. 14 is a perspective view of an installed removable visor.

FIG. 14 shows the removable visor installed to vehicle sheet steel 60. A user may desire to remove the visor 50 for routine maintenance or to gain access to certain regions of the vehicle. In order to remove the removable visor 1, a user may depress the flexible snap 11 which will allow a user to rotate the removable visor 1 via the bracket 10 into a release position shown in FIG. 12. The arrow on FIG. 15 illustrates the rotational release direction. The removable visor 1 can then be freely removed from the vehicle sheet steel 60. According to one embodiment, a probe, such as a screwdriver may be used to depress the flexible snap 11.

FIG. 18 is a perspective, top and profile view of a bracket, a cover, a cover attached to a bracket and a bracket engaged with a cover. The components shown in FIG. 18 and their operation are described in detail above.

The above-described device has several advantages. The removable visor 1 is a screw-less system that allows for easy and convenient removal of a visor mounted in a vehicle. If the visor is damaged it can be easily replaced. In addition, if the visor obstructs access to an area of the vehicle for the purpose of repairs, etc., the removable visor can be easily detached from the vehicle interior.

It is important to note that the construction and arrangement of the removable visor as shown in the various exemplary embodiments is illustrative only. Although only a few embodiments of the present systems have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described in the application. For example, elements shown as integrally formed may be constructed of multiple parts or elements, the position of elements may be reversed or otherwise varied, and the nature of number of discrete elements or positions may be altered or varied. Accordingly, all such modifications are intended to be included within the scope of the subject matter described in the application. The order or sequence of any process or method steps may be varied or re-sequenced according to alternative embodiments. Other substitutions, modifications, changes and omissions may be made in the design, operating conditions and arrangement of the exemplary embodiments.

What is claimed:

1. A removable visor, comprising:
   a cover having a slot;
   a bracket, configured to be positioned inside the cover, the bracket having a flexible snap configured to be inserted into the slot;
   an elbow, configured to be attached to the bracket through an opening in the cover;
   an arm extending from the elbow; and
   a visor attached to the arm,
   wherein the cover is bowl-shaped and the slot is configured to be positioned on a side of the cover.

2. A removable visor, according to claim 1, wherein the bracket is configured to rotate inside the cover to lock and unlock the bracket from the cover by engaging and disengaging, respectively, the flexible snap and the slot.

3. A removable visor, comprising:
   a cover having a slot;
   a bracket, configured to be positioned inside the cover, the bracket having a flexible snap configured to be inserted into the slot;
   an elbow, configured to be attached to the bracket through an opening in the cover;
   an arm extending from the elbow; and
   a visor attached to the arm,
   wherein the bracket is cylinder-shaped.

4. A removable visor, comprising:
   a cover having a slot;
   a bracket, configured to be positioned inside the cover, the bracket having a flexible snap configured to be inserted into the slot;
   an elbow, configured to be attached to the bracket through an opening in the cover;
   an arm extending from the elbow; and
   a visor attached to the arm,
   wherein the bracket further comprises:
      a rib positioned on one end of the flexible snap, wherein the flexible snap extends from the perimeter of the bracket; and
      at least one lobe, positioned on the top of the bracket, configured to attach the removable visor to an interior ceiling of a vehicle.

5. A removable visor, comprising:
   a cover having a slot;
   a bracket, configured to be positioned inside the cover, the bracket having a flexible snap configured to be inserted into the slot;
   an elbow, configured to be attached to the bracket through an opening in the cover;
   an arm extending from the elbow; and
   a visor attached to the arm,
   wherein the bracket is configured to rotate inside the cover to lock and unlock the bracket from the cover by engaging and disengaging, respectively, the flexible snap and the slot, and wherein when the removable visor is in a locked position, the flexible snap may be depressed in order to permit rotation of the removable visor into an unlocked position.

6. A removable visor, comprising:
a cover having a slot;
a bracket, configured to be positioned inside the cover, the bracket having a flexible snap configured to be inserted into the slot;
an elbow, configured to be attached to the bracket through an opening in the cover;
an arm extending from the elbow; and
a visor attached to the arm,
wherein the cover, bracket, elbow, arm and visor are comprised of at least one of nylon and plastic.

7. A vehicle, comprising:
a removable visor, comprising:
   a cover having a slot;
   a bracket, configured to be positioned inside the cover, the bracket having a flexible snap configured to be inserted into the slot;
   an elbow, configured to be attached to the bracket through an opening in the cover;
   an arm extending from the elbow; and
   a visor attached to the arm,
wherein the bracket further comprises at least one lobe, positioned on the top of the bracket, configured to attach the removable visor to an interior ceiling of the vehicle.

8. The removable visor of claim 2, wherein when the removable visor is in a locked position, the flexible snap may be depressed in order to permit rotation of the removable visor into an unlocked position.

9. The removable visor of claim 8, wherein the flexible snap comprises a rib configured to be engaged through the slot by a probe for depressing the flexible snap.

10. The removable visor of claim 3, wherein the bracket is configured to rotate inside the cover to lock and unlock the bracket from the cover by engaging and disengaging, respectively, the flexible snap and the slot.

11. The removable visor of claim 10, wherein when the removable visor is in a locked position, the flexible snap may be depressed in order to permit rotation of the removable visor into an unlocked position.

12. The removable visor of claim 11, wherein the flexible snap comprises a rib configured to be engaged through the slot by a probe for depressing the flexible snap.

13. The removable visor of claim 4, wherein the bracket is configured to rotate inside the cover to lock and unlock the bracket from the cover by engaging and disengaging, respectively, the flexible snap and the slot.

14. The removable visor of claim 13, wherein when the removable visor is in a locked position, the flexible snap may be depressed in order to permit rotation of the removable visor into an unlocked position.

15. The removable visor of claim 5, wherein the flexible snap comprises a rib configured to be engaged through the slot by a probe for depressing the flexible snap.

16. The removable visor of claim 5, wherein the cover is bowl-shaped and the slot is configured to be positioned on a side of the cover.

17. The removable visor of claim 5, wherein the bracket is cylinder-shaped.

18. The removable visor of claim 6, wherein the bracket is configured to rotate inside the cover to lock and unlock the bracket from the cover by engaging and disengaging, respectively, the flexible snap and the slot.

19. The removable visor of claim 18, wherein when the removable visor is in a locked position, the flexible snap may be depressed in order to permit rotation of the removable visor into an unlocked position.

20. The removable visor of claim 19, wherein the flexible snap comprises a rib configured to be engaged through the slot by a probe for depressing the flexible snap.

* * * * *